United States Patent
Satake

(10) Patent No.: US 10,960,836 B2
(45) Date of Patent: Mar. 30, 2021

(54) POWER SUPPLY UNIT

(71) Applicant: Yazaki Corporation, Tokyo (JP)

(72) Inventor: Shuuji Satake, Susono (JP)

(73) Assignee: YAZAKI CORPORATION, Tokyo (JP)

( * ) Notice: Subject to any disclaimer, the term of this patent is extended or adjusted under 35 U.S.C. 154(b) by 137 days.

(21) Appl. No.: 16/389,337

(22) Filed: Apr. 19, 2019

(65) Prior Publication Data

US 2019/0366957 A1 Dec. 5, 2019

(30) Foreign Application Priority Data

May 31, 2018 (JP) .............................. JP2018-104790

(51) Int. Cl.
*B60R 16/033* (2006.01)
*B60L 50/60* (2019.01)
*B60R 16/02* (2006.01)

(52) U.S. Cl.
CPC ............ *B60R 16/033* (2013.01); *B60L 50/60* (2019.02); *B60R 16/0207* (2013.01)

(58) Field of Classification Search
CPC combination set(s) only.
See application file for complete search history.

(56) References Cited

U.S. PATENT DOCUMENTS

| | | | | |
|---|---|---|---|---|
| 10,501,032 B2 * | 12/2019 | Secord | ................... | B60R 16/03 |
| 10,730,447 B1 * | 8/2020 | Hemphill | ................... | E05C 7/02 |
| 2010/0066302 A1 * | 3/2010 | Gregg | ................... | B60W 20/13 320/104 |
| 2010/0177543 A1 * | 7/2010 | Dedona | ................... | B60R 11/00 363/145 |
| 2010/0187029 A1 * | 7/2010 | Young | ................... | B60K 6/46 180/65.31 |
| 2011/0313587 A1 * | 12/2011 | Lin | ................... | H02H 3/207 700/296 |
| 2012/0244398 A1 * | 9/2012 | Youngs | ................... | B60L 3/0084 429/61 |
| 2013/0134908 A1 * | 5/2013 | Sugiyama | ................... | B60L 58/40 318/3 |
| 2014/0277783 A1 * | 9/2014 | Knuth | ................... | H04Q 9/00 700/286 |
| 2016/0009232 A1 * | 1/2016 | Budny | ................... | B25H 3/02 206/373 |

(Continued)

FOREIGN PATENT DOCUMENTS

| | | | |
|---|---|---|---|
| JP | 2012243424 A | * | 12/2012 |
| JP | 2014204652 A | * | 10/2014 |
| JP | 2018-078752 A | | 5/2018 |

*Primary Examiner* — Adam D Houston
(74) *Attorney, Agent, or Firm* — Sughrue Mion, PLLC

(57) ABSTRACT

Provided is a power supply unit capable of simplifying a structure of a temperature adjustment mechanism. Electric component power supplies and DC/DC converters and a junction box are accommodated in the same accommodating unit as a drive power supply, and thus the drive power supply and the box and the electrical component power supplies are arranged close to each other. As a result, a cooling unit for cooling the drive power supply and the electrical component power supplies can be made common. Further, heat can be transferred between parts housed in the accommodating unit, omitting the heating unit and lowering the capacity thereof.

4 Claims, 5 Drawing Sheets

(56) References Cited

U.S. PATENT DOCUMENTS

| | | | |
|---|---|---|---|
| 2016/0091217 A1* | 3/2016 | Verberkt | H04L 67/025 700/276 |
| 2016/0152197 A1* | 6/2016 | Kugimiya | H02G 3/0406 174/72 A |
| 2016/0347183 A1* | 12/2016 | Kusumi | B60L 50/00 |
| 2017/0028981 A1* | 2/2017 | Ogawa | B60W 20/12 |
| 2017/0070090 A1* | 3/2017 | Miller | H01R 13/6683 |
| 2017/0237266 A1* | 8/2017 | Hatakeyama | H02J 4/00 307/24 |
| 2017/0256941 A1* | 9/2017 | Bowers | H02J 13/0006 |
| 2018/0038633 A1* | 2/2018 | Buttolo | B60H 1/00 |
| 2018/0072252 A1* | 3/2018 | Collins | B60R 16/0238 |
| 2018/0126866 A1 | 5/2018 | Nozawa | |
| 2018/0304831 A1* | 10/2018 | Tanaka | H02G 3/30 |
| 2018/0326928 A1* | 11/2018 | Saito | B60R 16/0215 |
| 2019/0008090 A1* | 1/2019 | Dretzka | A01D 34/001 |
| 2019/0013766 A1* | 1/2019 | Stach | H02J 7/35 |
| 2019/0084506 A1* | 3/2019 | Gutierrez | F02N 11/0807 |
| 2019/0118744 A1* | 4/2019 | Takamatsu | B60R 16/0215 |
| 2019/0126860 A1* | 5/2019 | Takamatsu | B60R 16/0215 |
| 2019/0148929 A1* | 5/2019 | Wang | H02H 3/162 361/42 |
| 2019/0161033 A1* | 5/2019 | Satake | B60R 16/033 |
| 2019/0187201 A1* | 6/2019 | Gonzalez | H02M 1/32 |
| 2019/0214844 A1* | 7/2019 | Khafagy | H02H 3/087 |
| 2019/0270382 A1* | 9/2019 | Pfizenmaier | B60L 3/0069 |
| 2019/0359072 A1* | 11/2019 | Takeda | B60L 3/0023 |
| 2020/0083502 A1* | 3/2020 | Fan | H01M 2/34 |
| 2020/0086743 A1* | 3/2020 | Jala | H02H 3/025 |
| 2020/0099243 A1* | 3/2020 | Horita | H02J 2207/20 |
| 2020/0099814 A1* | 3/2020 | Horita | H04N 1/00899 |
| 2020/0108819 A1* | 4/2020 | Revach | B60W 20/13 |
| 2020/0112163 A1* | 4/2020 | Revach | H01H 71/70 |
| 2020/0136406 A1* | 4/2020 | Suzuki | H02P 11/04 |
| 2020/0148136 A1* | 5/2020 | Takei | B60R 16/0231 |
| 2020/0189395 A1* | 6/2020 | Takahashi | B60L 3/0061 |
| 2020/0204085 A1* | 6/2020 | Ichijo | H01L 23/473 |
| 2020/0247227 A1* | 8/2020 | Kawamura | B60R 16/0215 |

* cited by examiner

POWER SUPPLY UNIT

BACKGROUND OF THE INVENTION

Field of the Invention

The present invention relates to a power supply unit for supplying power to a load mounted on a vehicle.

Description of the Related Art

Generally, a vehicle such as a hybrid vehicle and an electric vehicle is provided with a high-voltage drive power supply for supplying electric power to a drive motor, and a low-voltage electrical component power supply for supplying power to other electric loads (electrical components). As the vehicle provided with two types of power supplies in this manner, the motor vehicle has been proposed which is provided with a converter between a main battery (drive power supply) and an auxiliary machine (electric components) (see, for example, Patent Document 1). An electric vehicle described in Patent Document 1, at that time that a failure occurred in the auxiliary battery (electrical component power supply), electric power, due to the provision of a converter, can be supplied from the main battery to the auxiliaries.

CITATION LIST

Patent Document; Japanese Unexamined Patent Application Publication No. 2018-78752

SUMMARY OF THE INVENTION

However, when two types of power supply are provided as the electric vehicle as described in Patent Document 1, a temperature adjustment structure for keeping the power supply at an appropriate temperature (cooling or heating) needs to be provided independently with respect to each power supply, so there is a disadvantage that a configuration thereof tends to be complicated.

An object of the present invention is to provide a power supply unit capable of simplifying the configuration of the temperature adjustment structure.

A power supply unit of the present invention is for supplying power to loads mounted on a vehicle, including a drive power supply for supplying electric power to a drive motor and electrical components as the load, at least one electrical component power supply for supplying power to the electrical components, at least one step-down converter provided between the drive power supply and the electrical components; a distribution unit for distributing power of the drive power supply and the electrical component power supply to a plurality of electrical components and an accommodating unit for accommodating the drive power supply, and the electrical component power supply, the step-down converter and the distribution unit are accommodated in the accommodating unit.

According to such a power supply unit as the present invention, since the electrical component power supply, the step-down converter and the distribution unit are accommodated in the same accommodating unit as accommodates the drive power supply, the drive power supply and the electrical component power supply are located close to each other. As a result, the cooling unit for cooling the drive power supply and the electrical component power supply can be shared. In addition, when one of the drive power supply and the electrical component power supply is low in temperature, the heat generated by another of the power supply, the step-down converter and the distribution unit can be easily transmitted to the low temperature power supply, thus omitting a heating unit, or reducing capacity thereof. As described above, according to the power supply unit of the present invention, the configuration of the temperature adjustment structure can be simplified.

DETAILED DESCRIPTION OF THE PREFERRED EMBODIMENTS

Figure 1:
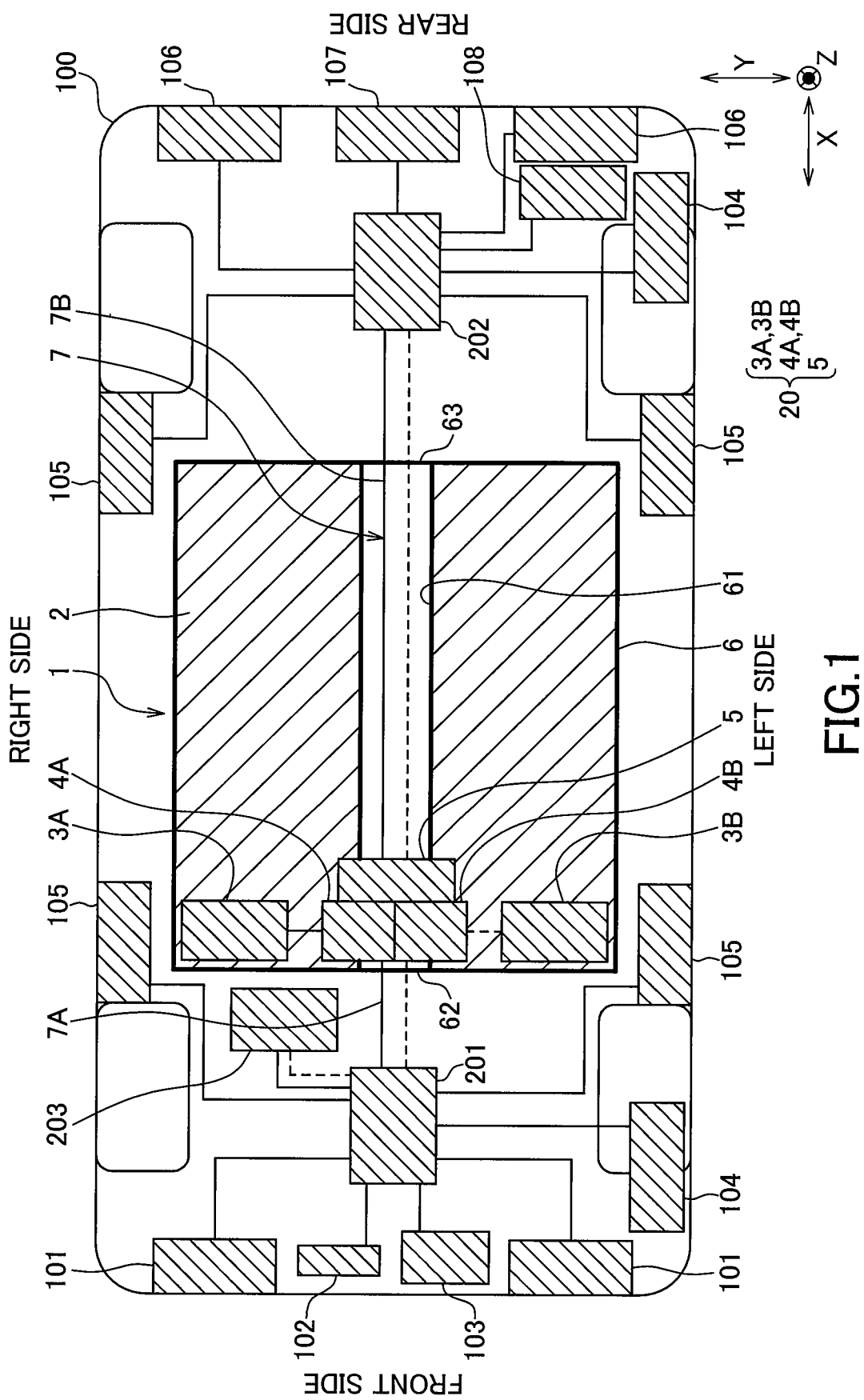
FIG. 1 is a plan view showing a vehicle provided with a power supply unit according to an embodiment of the present invention.
Figure 2:
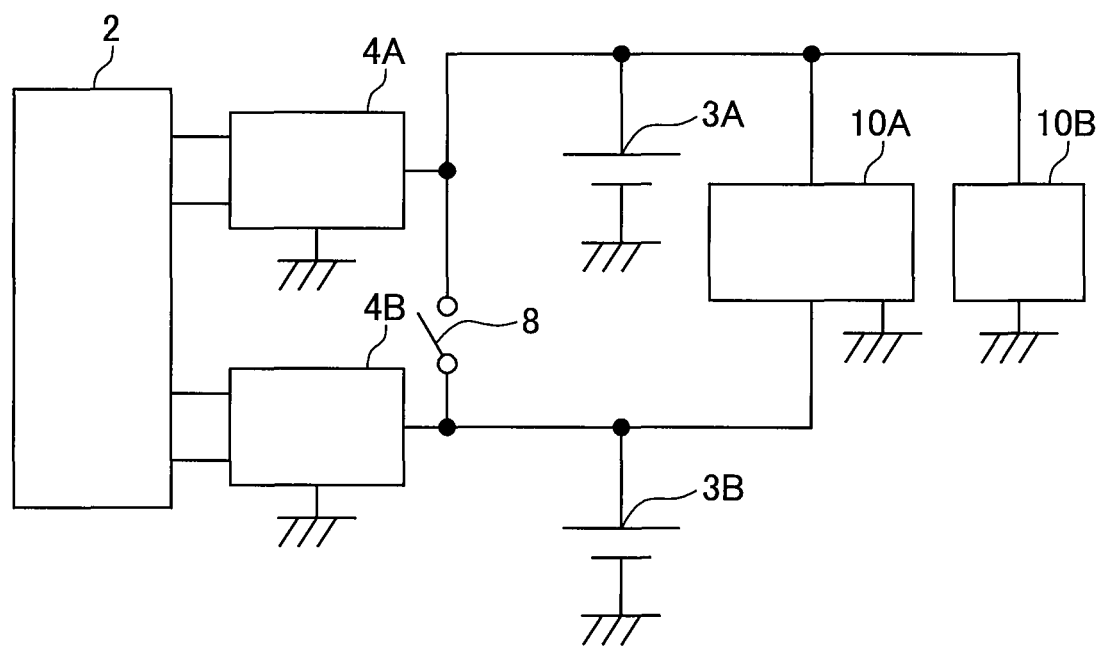
FIG. 2 is a circuit diagram showing the power supply unit.

Embodiments of the present invention will be described below with reference to the drawings. In the power supply unit 1 of the present embodiment is, as shown in FIGS. 1 and 2, provided in a floor portion of a vehicle 100, and includes a drive power supply 2, two electrical component power supplies 3A and 3B, two DC/DC converters 4A and 4B as step-down converter, a junction box 5 as distribution unit, an accommodating unit 6, a wire harness 7, and a switch 8. In the present embodiment, a longitudinal direction of the vehicle 100 is assumed as X direction, a width direction Y direction, and a vertical direction Z direction.

The vehicle 100 is an electric vehicle for example, and includes two front and rear drive motors as load, an automatic operation load 10A, and a general load 10B. Two front and rear drive motors are for driving front wheels and rear wheels, respectively, but only one driving motor may be provided. Further, the vehicle 100 may be a hybrid car including a drive motor and an engine.

The automatic operation load 10A and the general load 10B are electrical components provided in the vehicle 100. The electrical components are components other than the drive motor to which electric power is supplied, and applications and functions thereof are not limited to this. The automatic operation load 10A is an electrical component necessary for automatic operation carrying out driving and controlling at least one of accelerator, steering wheel, and brake. In the present embodiment, ECU 203 for the automatic operation corresponds to the automatic operation load 10A.

The general load 10B is an electrical component which is not necessary for the automatic operation such as air conditioner and audio. In the present embodiment, two head lamp assemblies 101 arranged in front and right and left, a horn 102 disposed forward and in the middle part on the right side in the Y direction, and an exterior speaker 103 disposed forward and in the middle part on the left side in the Y direction, and two slide door drive motors 104 arranged on the left side in the Y direction and back and forth, four side turn lamps 105 disposed on the rear side of the front wheels and the front side of the rear wheels, two rear lamp assemblies 106 disposed rearward and left and right, a license lamp 107 disposed rearward and at the center in the Y direction, and a washer motor 108 disposed rearward and on the left side in the Y direction correspond to the general load 10B.

The vehicle 100 is provided with a front area controller 201 to which electrical components on the front side are connected, and a rear area controller 202 to which electrical components on the rear side is connected. The area controllers 201 and 202 are junction boxes to which power of a voltage substantially equal to a voltage of the electrical component power supplies 3A and 3B is supplied and distribute electric power to each electrical component. It is noted that the ECU 203 is also connected to the area controller 201.

The drive power supply 2 is constituted by a lithium ion battery of a plurality of cells for example, and supplies power to the drive motor and the electrical components. The voltage of the drive power supply 2 is higher than that of the electrical component power supplies 3A and 3B. The drive power supply 2 is stepped down by the DC/DC converters 4A and 4B and connected to the electrical components and applies voltage to the electrical components.

The electrical component power supplies 3A and 3B are constituted by lithium ion batteries for example, and supply power to the electrical components. The voltage of the electrical component power supplies 3A, 3B may be, for example, 12V, 48V, or the like. One electrical component power supply 3A is used as a main power supply and the other electrical component power supply 3B is used as an auxiliary power supply.

The DC/DC converters 4A and 4B are provided between the drive power supply 2 and the electrical components, and step down the voltage of the drive power supply 2 to a voltage substantially equal to the voltage of the electrical component power supplies 3A and 3B. A switch 8 is provided between the two DC/DC converters 4A and 4B, and switches between connection and disconnection.

The junction box 5 distributes the electric power of the drive power supply 2 and the electric component power supplies 3A, 3B to a plurality of electrical components, and is connected to the drive power supply 2 via the DC/DC converters 4A, 4B, as well as is directly connected to the electrical component power supplies 3A and 3B. The junction box 5 is connected to the area controllers 201, 202 with the wire harness 7, and supplies electric power.

For example, the accommodating unit 6 is a rectangular parallelepiped case with a flat shape in which the dimension in the Z direction is smaller than the dimension in the X direction and the dimension in the Y direction, and accommodates the drive power supply 2, the electrical component power supplies 3A, 3B, the DC/DC converter 4A, 4B and the junction box 5. In FIG. 1, although the shape of the accommodation unit 6 is square, the shape of the accommodating unit 6 may be appropriately selected according to the outer shape of the drive power supply 2. In the central portion of the accommodating unit 6 in the Y direction, a passing portion 61 extending in the X direction through which the harness 7 passes is formed, and opening portions 62 and 63 from which the wire harness 7 is drawn out is formed at the front end and the rear end.

The wire harness 7 is constituted by a first wire harness 7A connected to the junction box 5 and extending toward the front area controller 201, and a second wire harness 7B connected to the junction box 5 and extending to the rear area controller 202 on the rear side. The first wire harness 7A passes through the opening 62 and is drawn out outside the accommodating unit 6, and the second wire harness 7B is drawn out through the opening 63 outside the unit 6. The wire harness 7 is constituted by a main system (shown by a solid line) to be connected to the main electric component power supply 3A, and a redundant system (shown by a broken line) connected to the auxiliary electrical component power supply 3B. Note that the first wire harness 7A and the second wire harness 7B may be configured to simply pass the openings 62, 63, or a connector may be provided in the opening 62, 63, via which the wire harness inside the accommodating unit 6 and the outside wire harness are connected.

The electrical component power supplies 3A and 3B and the DC/DC converters 4A and 4B and the junction box 5 constitute the distribution unit 20. In the present embodiment, the distribution unit 20 is disposed in the front side region in the accommodating unit 6. The drive power supply 2 may not be disposed in the region where the distribution unit 20 of the accommodating unit 6 is arranged, or the drive power supply 2 and the distribution unit 20 may be overlapped in the Z direction. Further, the DC/DC converters 4A and 4B at the central portion in the Y direction, and the two electric component power supplies 3A, 3B are disposed sandwiching the DC/DC converters 4A, 4B from the Y direction. The junction box 5 may be disposed frontward or rearward with respect to the DC/DC converters 4A and 4B, or may be arranged to overlap in the Z direction.

The accommodating unit 6 is provided with a cooling unit and a heat transfer unit as a temperature control mechanism. The heating unit may be further provided as the temperature control mechanism. The cooling unit is for cooling the drive power supply 2 and the electrical component power supplies 3A, 3B, and includes, for example, fins, air blowing unit or the like.

The heat transferring unit transfers heat between each part (the drive power supply 2, the electrical component power supplies 3A, 3B, the DC/DC converters 4A, 4B, and the junction box 5) accommodated in the accommodating unit 6, and includes a flow path (for example, a tube through which a liquid flows). For example, if desirable characteristics cannot be obtained due to low temperature of the power supplies 3A and 3B, heat generated by the DC/DC converter 4A, 4B may be transferred to the electrical component power supplies 3A and 3B. Note that the heat transfer fluid may be circulated naturally due to the temperature difference between the parts or may be forcibly circulated by the fluid feeding unit.

According to this embodiment as described above, there are the following effects. That is, since the electrical component power supplies 3A and 3B and the DC/DC converters 4A, 4B and the junction box 5 are accommodated in the same accommodating unit 6 as accommodates the drive power supply 2, the drive power supply 2 and the electrical component power supplies 3A and 3B come close to each other. As a result, the cooling unit for cooling the drive power supply 2 and the electrical component power supplies 3A and 3B can be shared. In addition, heat can be transferred between each part (the drive power supply 2, the electrical component power supply 3A, 3B, the DC/DC converters 4A, 4B, and the junction box 5) accommodated in the accommodating unit 6, thus omitting the heating unit or reducing capacity thereof.

Further, since there is provided the passing portion 6 in the accommodating unit 6, which extends along the X direction that is the front-rear direction of the vehicle, a step or an unevenness is hard to be formed in comparison with the configuration in which the wire harness is superimposed in the Z direction. As a result, the vehicle 100 is lowered and the interior space of the vehicle is made wider.

In addition, since the power supply unit 1 includes two electrical component power supplies 3A and 3B and two DC/DC converters 4A and 4B, when a failure or the like occurs in one system, the other system can therefore drive the vehicle 100.

It should be noted that the present invention is not limited to the above-described embodiment, and includes other configurations and the like where the object of the present invention can be achieved, and the following modifications and the like are included in the present invention.

For example, in the above embodiment, while the distribution unit 20 is arranged in the front side region in the accommodating unit 6, in addition, the DC/DC converters 4A and 4B are arranged in the center portion in the Y direction, and two electrical components power supplies 3A and 3B are disposed so as to sandwich the DC/DC converters 4A and 4B from the Y direction, the present invention is not limited to such arrangement.

Figure 3:
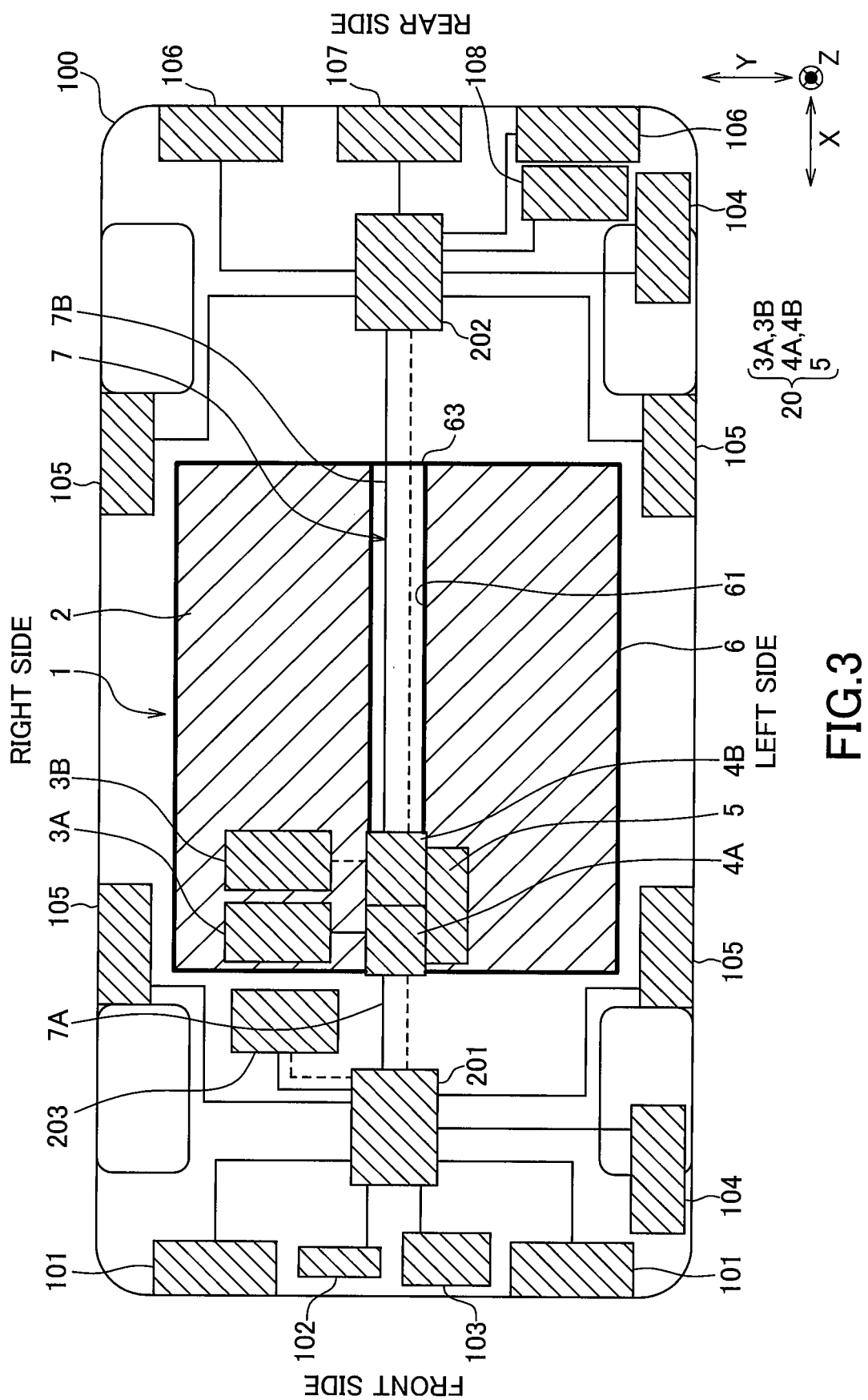
FIG. 3 is a plan view showing a vehicle provided with a power supply unit according to a first modified example of the present invention.

As shown in FIG. 3, the distribution unit 20 may be disposed in the front side region in the accommodating unit 6, as well as the DC/DC converters 4A, 4B in the center portion in the Y direction, and the two electric component power supplies 3A, 3B on one side in the Y direction with respect to the DC/DC converters 4 (the right side in the illustrated example). Note that the junction box 5 is disposed on the opposite side of the electrical component power supplies 3A and 3B across the DC/DC converters 4A and 4B.

Figure 4:
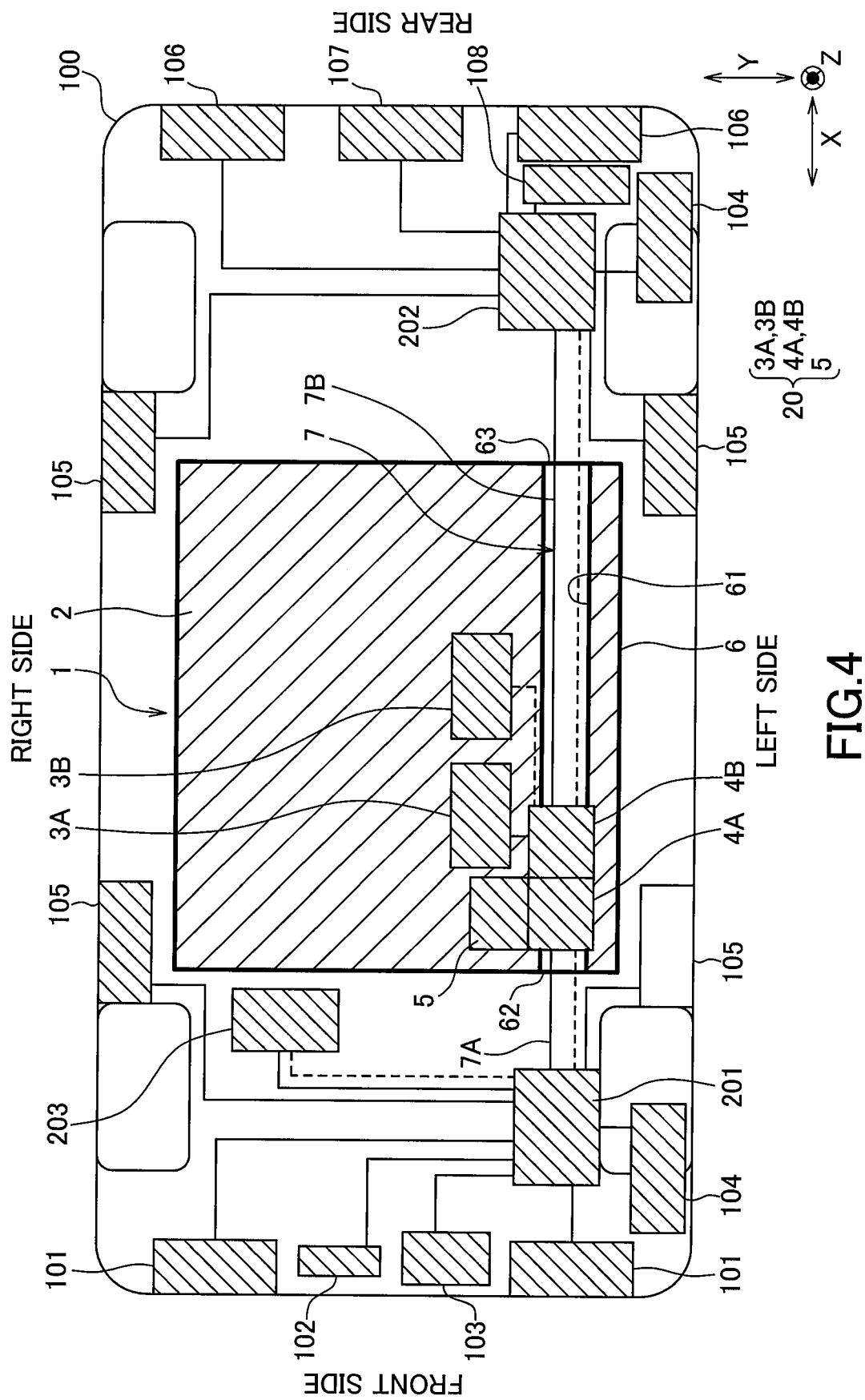
FIG. 4 is a plan view showing a vehicle provided with a power supply unit according to a second modification of the present invention.

Further, as shown in FIG. 4, the distribution unit 20 may be arranged in the front side region in the accommodating unit 6, the DC/DC converters 4A and 4B on one side (the left side in the illustrated example) in the Y direction, and the two electrical component power supplies 3A and 3B on the other side (the right side in the illustrated example) in the Y direction with respect to the DC/DC converters 4A and 4B. In addition, the junction box 5 is arranged on the front side of the electrical component power supplies 3A, 3B.

Figure 5:
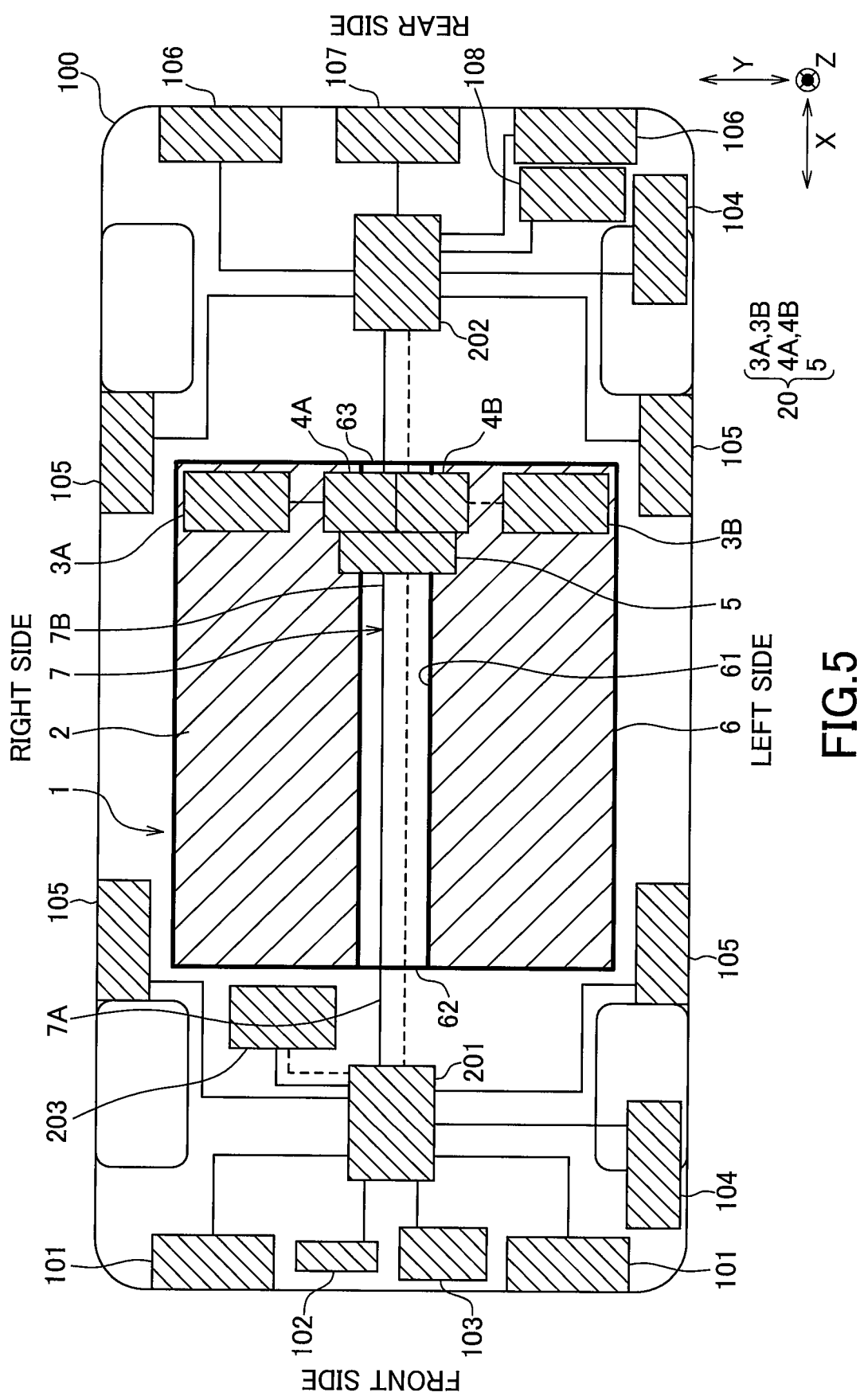
FIG. 5 is a plan view showing a vehicle provided with a power supply unit according to a third modified example of the present invention.

Further, as shown in FIG. 5, the distribution unit 20 may be arranged in the rear side region in the accommodating unit 6, and the DC/DC converters 4A and 4B in the center portion in the Y direction, and the two electric component electric power supplies 3A and 3B may be arranged so as to sandwich the DC/DC converters 4A and 4B from the Y direction.

In this way, the disposition of the distribution unit 20 in the accommodation unit 6 and the arrangement of the electrical component power supplies 3A, 3B and the DC/DC converters 4A and 4B may be appropriately set.

Further, in the above-described embodiment, while the passing portion 61 through which the wire harness 7 passes in the X direction that is front and rear direction of the vehicle is formed in the accommodating unit 6, the passing portion may be formed extending in the other direction such as the Y direction or the like. Further, for example, when the distribution unit 20 arranged at the end in the Y direction in the accommodating unit 6 and the wire harness is easily drawn out from the accommodating unit 6, the wire harness may be wired at a position adjacent to the accommodating unit 6 in the Y direction with respect to the accommodating unit 6 so as to extend along the X direction.

In the above embodiment, while the power supply unit 1 includes two electrical component power supplies 3A, 3B and two DC/DC converters 4A and 4B, the power supply unit may include an appropriate number of electric component power supply and DC/DC converter, and the number may be one or otherwise 3 or more. Also, the numbers of the electrical component power supply and the DC/DC converter may differ from each other.

In addition, while the best configurations, methods, and the like for carrying out the present invention are disclosed in the above description, the present invention is not limited to this. That is, the present invention is illustrated and described specifically mainly with respect to a specific implementation, it is to be understood that without departing from the spirit and scope of the present invention in contrast to the embodiments described above, the shape, material, quantity, other details modifications can be made by those skilled in the art. Therefore, since the description that limits the shape, material, etc. disclosed above is described illustratively in order to facilitate the understanding of the present invention, but does not limit the present invention, the description in the name of the member with the limitation of part or all of the fixed part limitations on the shape, material, etc. thereof should be included in the present invention.

REFERENCE SIGNS LIST 1 feed unit
2 drive power supply
3A, 3B power supply components
4A, 4B DC/DC converter (buck converter)
5 junction box (distribution unit)
6 storage unit
61 passage part
7 wire harness
10 automatic operation load (electrical component)
10B general load (electrical component)

What is claimed is:

1. A power supply unit for supplying power to a load mounted on a vehicle, comprising:
   a drive power supply for supplying electric power to a drive motor and electrical components as the load;
   at least one electrical component power supply for supplying power to the electrical components;
   at least one step-down converter provided between the drive power supply and the electrical components;
   a distribution unit for distributing power of the drive power supply and the electrical component power supply to a plurality of electrical components; and
   an accommodating unit for accommodating the drive power supply, wherein
   the electrical component power supply, the step-down converter and the distribution unit are accommodated in the accommodating unit, wherein
   the accommodating unit is provided with a cooling unit that cools the drive power supply and the electrical component power supply, and a heat transfer unit that transfers heat among the drive power supply, the electrical component power supply, the step-down converter and the distribution unit that are accommodated in the accommodation unit.

2. The power supply unit according to claim 1, further comprising
   a wire harness connected to the distribution unit and led out of the accommodating unit, wherein
a passage portion is formed in the accommodating unit, that extends in a front-rear direction of the vehicle and passes therethrough the wire harness.

3. The power supply unit according to claim 1, wherein a plurality of electrical component power supplies and a plurality of step-down converters are provided.

4. The power supply unit according to claim 2, wherein a plurality of electrical component power supplies and a plurality of step-down converters are provided.

\* \* \* \* \*